Figure 1:
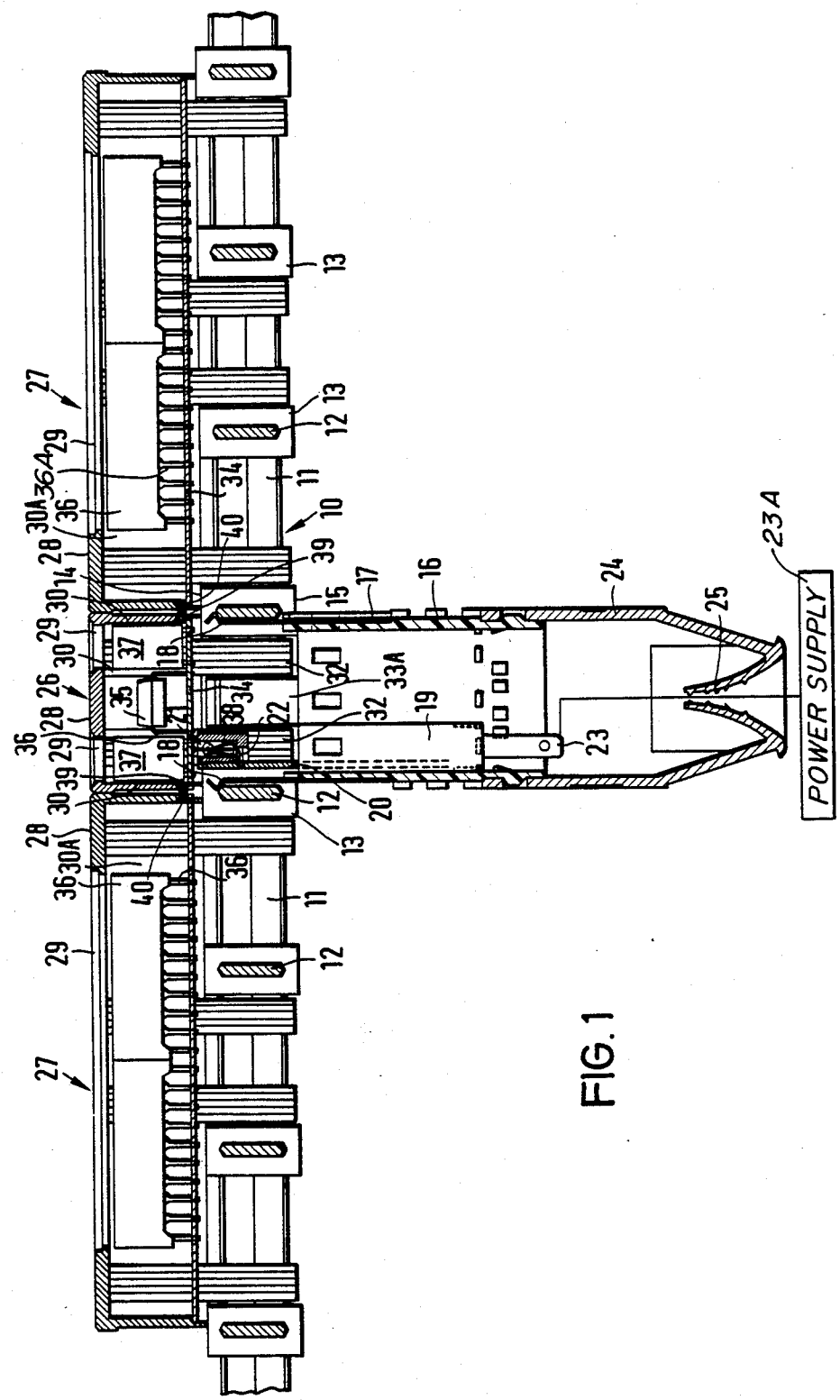

United States Patent [19]

Neumann

[11] Patent Number: 4,652,972
[45] Date of Patent: Mar. 24, 1987

[54] FRONT CONSTRUCTION UNIT FOR ELECTRICAL MONITORING PANEL

[75] Inventor: Ewald Neumann, Lohmar-Scheidehöhe, Fed. Rep. of Germany

[73] Assignee: Christof Subklew, Cologne, Fed. Rep. of Germany

[21] Appl. No.: 734,244

[22] Filed: May 14, 1985

Related U.S. Application Data

[63] Continuation of Ser. No. 478,349, Mar. 24, 1983, abandoned.

[51] Int. Cl.$^4$ ............................................... H02B 1/04
[52] U.S. Cl. ..................................... 361/395; 361/346; 361/413
[58] Field of Search ................. 248/27; 361/331, 380, 361/395, 399, 346–348, 393, 394, 396, 413, 341, 400; 200/314

[56] References Cited

U.S. PATENT DOCUMENTS

| | | | |
|---|---|---|---|
| 3,668,476 | 6/1972 | Wrabel | 361/413 |
| 3,707,652 | 12/1972 | Coffey | 361/341 |
| 3,737,729 | 6/1973 | Carney | 361/395 |
| 4,092,698 | 5/1978 | Brefka | 361/346 |
| 4,125,887 | 11/1978 | Reuting | 361/394 |
| 4,168,877 | 9/1979 | Little | 361/413 |
| 4,218,724 | 8/1980 | Kaufman | 361/395 |
| 4,365,903 | 12/1982 | Zeller | 200/314 |
| 4,401,351 | 8/1983 | Record | 361/395 |
| 4,402,037 | 8/1983 | Iwamura | 361/380 |

FOREIGN PATENT DOCUMENTS 2829721  8/1980  Fed. Rep. of Germany .

OTHER PUBLICATIONS

Subklew, Mosaic Tile System & Control Room Equipment, System SM 24, Mosaic and Wartenchnik-Brochure Publication.

*Primary Examiner*—G. P. Tolin
*Attorney, Agent, or Firm*—Birch, Stewart, Kolasch & Birch

[57] ABSTRACT

In an electrical monitoring panel comprising a grid frame (26,27) having front elements (26,27) disposed at its front side and instrument insets at its rear side, elements of the electric circuitry are arranged inside the front elements.

The front elements may be removed from the grid frame whereby the connection with the electric lines and components of the instrument inset is interrupted. The front elements are interconnected by contact elements to permit electric connections in the plane ahead of the grid frame.

7 Claims, 6 Drawing Figures

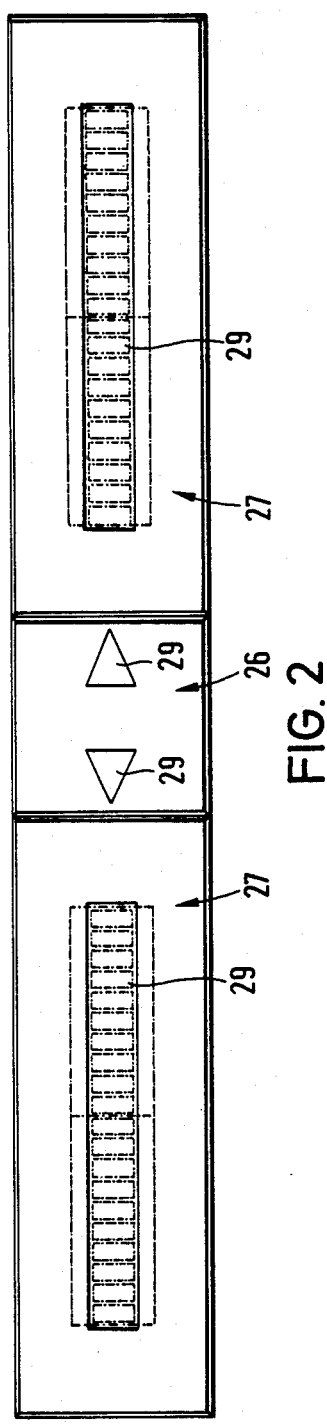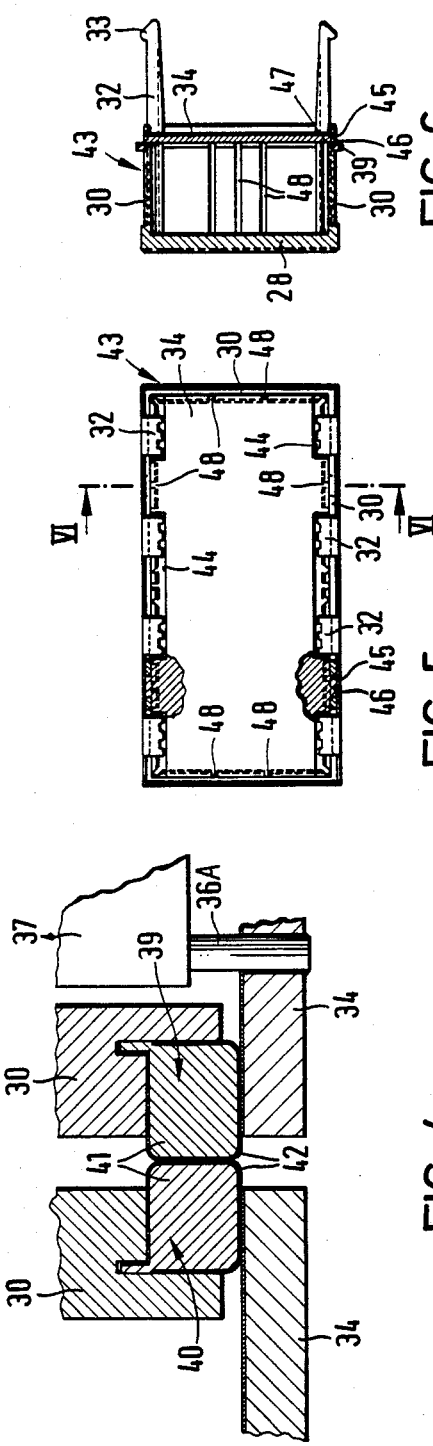

FRONT CONSTRUCTION UNIT FOR ELECTRICAL MONITORING PANEL

This application is a continuation of application Ser. No. 478,349 filed on Mar. 24, 1983, abandoned.

The invention relates to a front construction unit for electrical monitoring panels having a mosaic design, to cover the front sides of instrument insets secured to a grid frame, comprising a front wall, circumjacent side walls and rearwardly projecting clamping legs, the front wall and the side walls confining a chamber to receive electric elements.

In a known electrical monitoring panel (German Pat. No. 28 29 721), there are secured to the fields of a grid frame instrument insets projecting to the rear from the grid frame. The front ends of said instrument insets which contain electric circuits, carry indicators such as lighting devices, instruments, etc. or actuating means such as switches, push buttons or the like. Said indicators or actuating means extend through the grid frame into the front construction units whose front sides are composed to form a mosaic picture. The front sides of the front construction units are partly translucent, partly opaque. In addition, they may be printed by means of lines or switch symbols. The known front construction units have side walls which, together with the front wall confine a chamber. The rear edges of the side walls are supported by the struts of the grid frame. The front construction units are mounted at the grid frame by means of clamping legs projecting to the rear from the side walls and extending through the corresponding grid frame field to be supported in resilient divergence at the rear side of the grid frame.

An electric monitoring panel of this type is unfavorable in that one instrument inset only contains the circuits and electric components which are coacting with the indicator and adjusting elements of the corresponding front construction unit. As a result, an involved wiring is required between the instrument insets at the rear side of the grid frame. To this effect, there are mounted behind the grid frame cross connection distributors by which the line connection is realized between the individual instrument insets. The cross connection distributor by itself is connected to a switch cabinet which contains the control elements properly speaking. As a result of such a construction of the electric monitoring panels, the lines between the instrument insets beyond the cross connection distributor and between the instrument insets or the cross connection distributors and the switch cabinet are very long. The electrical construction of such equipment is, accordingly, very complicated and requires extensive assemblies at the place of erection.

While the instrument inset comprises a switching board extending into the chamber of the front construction unit and to which a lighting device or the like can be connected by a plug- and-socket connection, the problem of the expensive line wiring is not solved.

It is the object of the invention to considerably facilitate wiring of an electrical monitoring panel so as to greatly reduce the required wiring arrangement during the assembly as well as the space requirement and extent of the installation.

To solve the mentioned problem, it is provided according to the invention in connection with a front construction unit of the above mentioned type that in the chamber, a circuitry support is mounted whose lines can be connected via at least one plug-in or press connection to a line of the instrument inset or to the circuitry support of a laterally adjacent front construction unit.

It is possible by means of such a front construction unit to house a substantial portion of the electric wiring ahead of the grid frame. In case of electrical monitoring panels which have a plurality of front construction units, a substantial part of the circuity can be arranged inside the front construction units so that the front construction unit by itself forms the housing for part of the electric circuitry. As a result, part of the wiring can be mounted ahead of the grid frame in the housing formed by the front construction unit, which not only serves as a cap or cover for the signalling or adjusting elements secured to the instrument inset, but which contains a wiring part that with the removal of the clamping unit from the grid frame or from the instrument casing, is also taken off. This type of construction permits the housing of substantial elements of the circuitry in the front construction unit which assumes additional functions of the instrument inset.

As another advantage of the invention, the circuit elements in different front construction units can be interconnected, the connection not being established through the grid frames and the appertaining instrument insets, but directly in the plane of the front construction units ahead of the grid frame. Thus, a substantial part of the wiring operations can be realized directly between the front construction units designed as instrument or circuitry casings. To this effect, use can be also made of front construction units whose circuitry supports only contain connection lines to establish cross connections between adjacent or remote front construction units which include active or passive components. It is important that line connections can be established in the plane of the front construction units thus doing away with the need of conducting corresponding lines through the grid frames and through the instrument insets, because said lines will extend directly in the plane of the front construction units ahead of the grid frames.

While a unit construction system for the assembly of electric and/or electronic switch arrangements comprising square units of plastics has been known (DE-AS 22 64 205), wherein the individual units are inserted by means of correspondingly shaped bases into the fields of a grid frame, the upper portions of the units being provided with lateral contacts coming into direct contact ahead of the grid frame thus establishing electric connections ahead of the grid frame. The mentioned unit construction system concerns electric construction kits for instruction in which the connection of the units is performed exclusively in the plane ahead of the grid frame while no lines are conducted through the grid frame to the rear. The front construction units constitute at the same time the instrument insets which are electrically interconnected exclusively ahead of the plane of the grid frame. The region behind the grid frame plane is free of constructional elements and of wirings, the wiring plane thus being restricted to the region ahead of the grid frame—and to establish a mass connection, to the region within the grid frame at most.

In contradinstinction thereto, it is provided according to the invention, in connection with an electrical monitoring panel, to dispose part of the wiring connections ahead of, and part of the wiring connections behind the plane of the grid frame.

Preferably, the circuitry support is a switching board closing substantially the open rear side of the chamber, and on which, in a manner known per se, the lines are fitted as conducting paths. Said switching board is also the carrier for electric components such as integrated circuits, transistors, rheostats, signal lamps, switches etc. which are protectively housed in the front construction unit. If the latter is removed from the grid frame, all of the plug or press connections to the adjacent front construction units and to the instrument inset arranged behind the grid frame are disconnected at the same time. The front construction unit with the circuitry support secured thereto and the electric components contained in it forms an independent mechanical assembly which can be plugged mechanically and electrically and which, as a component of the circuitry contained in the electric monitoring panel takes part in the total operation as an "active kit".

The chamber also may contain an electric circuitry with active members such as electronic switches and logic elements which, via plug-in or press connection are connected to a power supply.

In an advantageous embodiment of the invention, the circuitry support comprises a contact element projecting laterally beyond a side wall of the front construction unit for its connection with a contact element of an adjacent front construction unit. The contact elements may either consist of plug-in connectors or of press-connectors. Such press connectors are resilient rolls having axially spaced, peripheral rings of electrically conductive material. The rings are interconnecting always two mutually aligned conducting paths of different switching boards. Preferably, the front construction units are made of plastics. Therefore, they are flexible to some extent, i.e. they can be deformed under pressure. According to a preferred embodiment of the invention, two opposite side walls of the chamber contain perforations for the insertion of attachments of the switching board which will be mounted in the chamber in that the front construction unit is slightly deformed by manual pressure thus allowing a locking of the attachments in the perforations. To ensure that the switching board will take a defined position within the front construction unit, the side walls of the chamber may have a step to support the switching board towards the front side. Said support serves as an abutment face for the switching board if pressure is exerted on it from the rear side of the front construction unit, as for example during the assembly of the front construction unit with the instrument inset.

An embodiment of the invention will be explained hereunder in detail with reference to the enclosed drawings.

Figure 3:
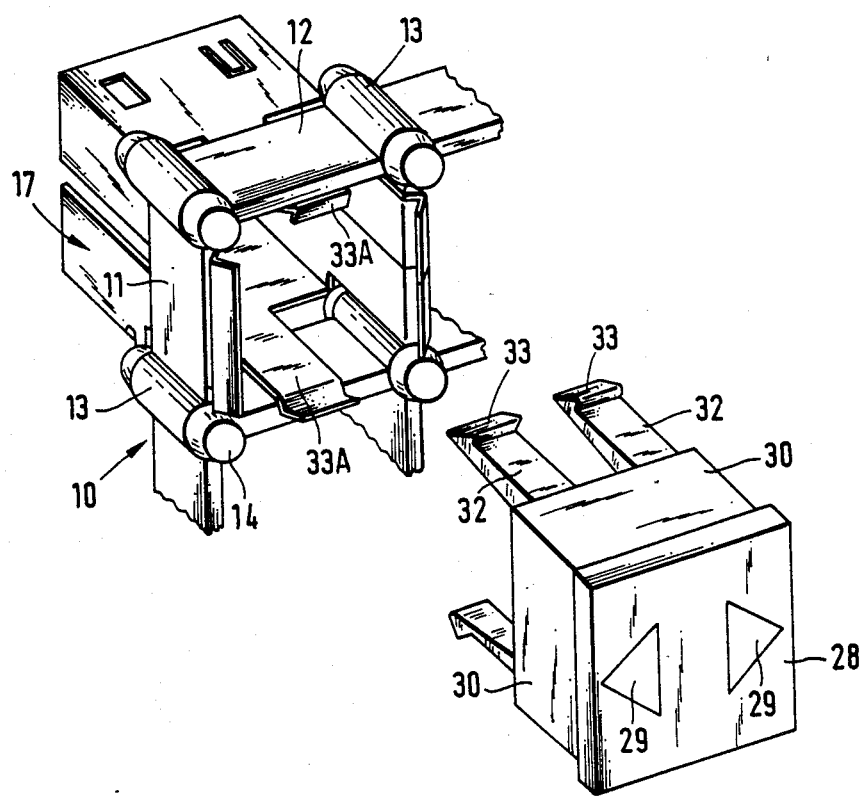

FIG. 1 is a cross section of a electrical monitoring panel,

FIG. 2 is a front view of the front construction units of electrical monitoring panels of FIG. 1, FIG. 3 is a perspective view of part of the grid frame, at which a spring clip is provided to secure thereto an instrument inset, together with a front construction unit, FIG. 4 is an enlarged view of the electric connection of two adjacent front construction units, FIG. 5 is a rear view of a double front construction unit covering two fields of the grid frame, and FIG. 6 is a section along line VI'VI of FIG. 5.

The basic element to which the substantial components of the electrical monitoring panels are secured, is a grid frame 10 consisting of rectangularly intersecting horizontal struts 11 and vertical struts 12. At their points of intersection, said struts are interconnected by means of cylindrical knot elements 13 which protrude laterally beyond struts 11,12 and which form abutment faces 14,15 for the element to be mounted at the grid frame.

At the rear side of the grid frame 10, there are mounted instrument insets 16 of which one is illustrated in FIG. 1. Said instrument inset 16 is made of plastics. A spring clip 17 attached to it, encloses the front end of the instrument inset 16 and projects beyond it in forward direction. Said spring clip 17 includes clamping legs 18 extending through the respective field of the grid frame and engaging with outwardly directed projections behind two oppositely situated struts 12 of the grid frame. The front side of the instrument inset 16 contacts with four corner points the abutment faces 15 of the grid frame. The grid inset 16 may contain several module units 19 of which one is shown in FIG. 1 and which includes a switching board 20 extending from the instrument inset 16 into the grid frame 10 and carrying plug-socket holders at its front end which are connected via wires 22 to (non-illustrated) conducting paths of the switching board 20. It is possible to dispose on the switching board 20 (non-illustrated) electrical elements. Contact pins 23 are projecting to the rear from the backward end of the model unit 19. One of the contact pins 23 is connected to a power supply 23A.

A cap 24, mounted at the backward end of the instrument inset 16, contains a passage limited by resilient tongues and serving for cables which are connected to the contact pins 23.

The front elements 26,27 are secured by plugging at the front side of the grid frame 10. The front construction unit 26 having a square front face is meant to cover one field of the grid frame. In contradistinction thereto, the front construction units 27 have front faces in the form of elongated rectangles. They cover three fields each of the grid frame. The front elements are placed side by side like a mosaic in a surface to form the front side of the electrical monitoring panel. Their front sides 28 may be provided with lines, switch symbols or the like, with transparent windows 29 or also with openings to actuate switches. The rectangular or square front elements 26,27 have side walls 30 extending at right angles to the front sides 28 and confining a chamber 30A together with the front sides. The rear ends of the side walls 30 butt against the front abutment faces 14 of the grid frame 10.

Each front element comprises clamping legs 32 projecting rearwardly from oppositely disposed side walls 30 and having at their ends outwardly directed noses 33. The clamping legs 32 extend through a field of the grid frame 10 to engage behind the respective struts 11 and 12, respectively, Between two corresponding clamping legs 32, a resilient tongue 33A of the spring clip 17 can be inserted.

The rear side of the chamber 30A is closed by means of a switching board 34 carrying electric elements e.g. integrated circuits 35, 36 which are situated inside the chamber 30A and which, by means of conductor legs 36A are connected to the (non-illustrated) conducting paths of the switching board 34. Conducting paths may be provided at both sides of the switching board 34, which, moreover, may carry light fittings 37 e.g. light emitting diodes, or switches or other elements. The light fittings 37 are arranged behind the windows 29.

The switching board 34 of the front element 26 illustrated in the centre of FIG. 1 also comprises outwardly directed plug pins 38 which extend into the region of the grid frame 10 and which, when the front element 26 is plugged on the grid frame 10, penetrate a respective plug-socket holder 21 of the corresponding instrument inset 16. By this means the switching board 34 acting as a circuitry support is connected to the power supply and to the outgoing and incoming signal lines.

The electric circuits contained in the switching boards 34 are directly interconnected in the embodiment of FIG. 1. This is achieved by contact elements 39,40 which are embedded in the side walls 30 of the front element and which project from the side walls 30 according to FIG. 4. The contact elements 39 and 40 are made of a solid body 41 of a relatively soft insulating plastic material. The The surface of the solid body contains a plurality of mutually insulated electric conducting paths 42 extending in parallel relative to each other. The body presses against the upper side of the switching board 34 thus causing its conducting paths 42 to come into contact with the conducting paths on the surface of the switching board 34.

Two corresponding conducting paths 42 of the two laterally counterpressed contact elements 39,40 coming into contact are formed beyond the contact elements 39,40 a conductive connection between mutually aligned conducting paths of the switching boards 34 in one common plane. This conductive connection does not require any soldered joints, it is achieved exclusively by elastic contact pressure. If one of the front elements is removed from the grid frame 10, the corresponding contact element is also separated from the contact element of the adjacent front element. Thus, supply voltages and signal voltages are transferred between conducting paths of switching boards 34 of adjacent front elements. The contact elements 39,40 which are arranged in corresponding recesses of the side walls 30 are firmmly seated in the latter to project from them laterally and to bring about a firm pressure contact between their conducting paths 42 and those of the switching board 34.

In the embodiment of FIGS. 1 and 2, the electric members 36 housed in the front elements 27 are light emitting diode arrangements and are subdivided into a plurality of fields located along a line. The windows 29 of the front element 26 are made in the form of arrows pointing to one of the adjacent front elements (FIG. 2). The arrow which lights up is marking the associated front clement 27 in which one of the fields lights up in window 29. Enabling of the associated light emitting diode within the light emitting diode group 36 and enabling of the light emitting diode 37 of the respective window 29 is performed via the circuitry in the instrument inset 16.

FIGS. 5 and 6 show a front element 43 covering two fields of the grid frame 10, but being made up in conformity with front elements 26 and 27. The clamping legs 32 mounted alongside of the front element 43, are so spaced that the resilient tongue 33 of a spring clip 17 can be inserted between them. The clamping legs 32 extend along the side walls 30 to the front wall. Therefore, at the positions of the clamping legs 32, the switching board 34 is provided with recesses 44.

According to FIG. 6, some places of the side walls 30 are provided with perforations 45 into which extend the attachments 46 of the switching board 34. Thus, the switching board 34 is undetachably secured to the front element 43. The switching board 34 additionally rests against a step 47 extending inside the chamber along the side walls 30 thus ensuring that the switching board cannot be pressed into the chamber.

At the side walls of the front element and inside the chamber, there are grooves 48 arranged oppositely in pairs. Said grooves 48 are meant for the insertion of partition walls preventing light, emitted from a lighting unit arranged in one chamber region, from getting into another chamber region.

What is claimed is:

1. An electrical monitoring panel of a mosaic design comprising
   a grid frame having a front face,
   a plurality of adjacent front structural units mounted on said front face,
   said units including at least one said front structural unit covering the front side of an instrument inset secured to said grid frame,
   each said front structural unit comprising a front wall, circumadjacent side walls and clamping legs projecting rearwardly and positioning said units on said grid frame,
   said front wall and said side walls confining a chamber,
   at least two adjacent ones of said front structural units having electrical components in said chambers,
   connection means for connecting said electrical components in said adjacent structural units,
   said connection means providing connections extending from two perpendicular side surfaces of each said unit, and
   said connection means being mounted on said front face of said grid frame.

2. An electrical monitoring panel according to claim 1, wherein said connection means includes a switching board substantially closing an open rear side of said chamber.

3. An electrical monitoring panel according to claim 1, wherein said chamber contains an electric circuit having active elements which are connected to a power supply via plug- or press connections.

4. An electrical monitoring panel according to claim 1, wherein said connection means includes a contact element projecting laterally beyond one said side wall of said unit to provide a conductive connection with an adjacent front construction unit by engaging a corresponding suitable contact element.

5. An electrical monitoring panel according to claim 2, wherein two opposite side walls of said chamber contain perforations into which are inserted attachments for said switching board.

6. An electrical monitoring panel according to claim 2, wherein said side walls of the chamber contain a step which supports said switching board towards the front side.

7. An electrical monitoring panel according to claim 1, wherein two opposite side walls of the chamber are provided with parallel grooves for the insertion of partition walls.

* * * * *